(12) United States Patent
Hatakeyama

(10) Patent No.: US 11,933,342 B1
(45) Date of Patent: Mar. 19, 2024

(54) NON-LOOSENING FASTENING STRUCTURE

(71) Applicant: Shiro Hatakeyama, Kanagawa (JP)

(72) Inventor: Shiro Hatakeyama, Kanagawa (JP)

( * ) Notice: Subject to any disclaimer, the term of this patent is extended or adjusted under 35 U.S.C. 154(b) by 0 days.

(21) Appl. No.: 18/546,203

(22) PCT Filed: Jul. 5, 2022

(86) PCT No.: PCT/JP2022/031472
§ 371 (c)(1),
(2) Date: Aug. 11, 2023

(87) PCT Pub. No.: WO2023/003047
PCT Pub. Date: Jan. 26, 2023

(30) Foreign Application Priority Data

Jul. 19, 2021 (JP) .................. 2021-138423

(51) Int. Cl.
*F16B 39/12* (2006.01)
(52) U.S. Cl.
CPC .................. *F16B 39/12* (2013.01)
(58) Field of Classification Search
CPC .......... F16B 21/18; F16B 35/00; F16B 39/10; F16B 39/12; F16B 39/16; F16B 39/24; F16B 39/32; F16B 43/00
USPC ......... 411/190, 191–194, 197–198, 432, 517
See application file for complete search history.

(56) References Cited

U.S. PATENT DOCUMENTS

| | | | | |
|---|---|---|---|---|
| 794,450 A | * | 7/1905 | Clapper | F16B 39/16 411/934 |
| 1,198,452 A | * | 9/1916 | Keadle | F16B 39/06 411/931 |
| 1,589,562 A | * | 6/1926 | Roach | F16B 39/32 411/953 |
| 1,866,067 A | * | 7/1932 | Strober | F16B 39/08 411/931 |

(Continued)

FOREIGN PATENT DOCUMENTS

| | | |
|---|---|---|
| CN | 101999052 | 3/2011 |
| JP | 6-307427 | 11/1994 |
| JP | 2002-106534 | 4/2002 |

(Continued)

OTHER PUBLICATIONS

International Search Report issued in International Application No. PCT/JP2022/031472, dated Sep. 27, 2022, 5 pages w/translation.

*Primary Examiner* — Roberta S Delisle
(74) *Attorney, Agent, or Firm* — HSML, P.C.

(57) ABSTRACT

To provide a fastening structure for fastening a left-right screw intersection forming bolt, which has a simple structure and does not loosen. A right screw nut having a recess, an elastic member having a rotation-preventing protrusion and a tongue portion, and a left screw nut having a tapered surface and a recess are included. After the bolt is tightened with the right screw nut and the elastic member is mounted, the tongue portion of the elastic member is tightened while being pressed with the left screw nut, so that the tongue portion jumps up to the recess of the left screw nut, and the (Continued)

left screw nut is locked and fastened. As illustrated in FIG. 9, the fastening structure can also be configured by changing the right screw nut to a left screw nut, the elastic member to an elastic member, and the left screw nut to a right screw nut.

2 Claims, 9 Drawing Sheets

(56) References Cited

U.S. PATENT DOCUMENTS 2,132,667 A * 10/1938 Wilson ................ F16B 39/16
411/933
2011/0262245 A1 10/2011 Michiwaki

FOREIGN PATENT DOCUMENTS

JP 2009-554410 2/2009
WO 2009/104767 6/2011

* cited by examiner

NON-LOOSENING FASTENING STRUCTURE

TECHNICAL FIELD

The present invention relates to a fastening structure used for fastening a bolt (hereinafter, referred to as a left-right screw intersection forming bolt) formed by coaxially intersecting a right screw and a left screw.

BACKGROUND ART

Conventionally, fastening structures using bolts and nuts are widely used for fastening members and the like in various vehicles, aircraft industry, machine tools, various buildings, and the like. However, these fastening structures had a problem for many years in that a fastening portion loosens.

In general, one right screw is formed on a shaft of the bottle, and it is fastened thereto with a right screw nut, but the fastening portion loosens due to vibration or the like.

As one of the fastening structures, there has been, for a long time, a method of fastening a bolt and two nuts by a method of fastening a right screw nut and a left screw nut to each other using a left-right screw intersection forming bolt, different from the general bolt described above. Patent Literature 1 and Patent Literature 2 are examples thereof. However, the techniques disclosed in these Literatures lack reliability in preventing screw loosening, for example, by using friction in a method of fastening the right screw nut and the left screw nut to each other.

Patent Literature 3 also uses the left-right screw intersection forming bolt to fasten the right screw nut and the left screw nut to each other, but there is a problem that the structure is too complicated.

CITATION LIST

Patent Literature

Patent Literature 1: Japanese Patent Application Laid-Open No. 06-307427 (line 19)
Patent Literature 2: Japanese Patent Application Laid-Open No. 2002-106534 (line 19)
Patent Literature 3: Japanese Patent Application No. 2009-554410 (line 21)

SUMMARY OF INVENTION

Technical Problem

It is an object of the present invention to provide a fastening structure which is not too complicated, does not loosen, can be reused, and can be easily unfastened, when fastening the left-right screw intersection forming bolt (1) illustrated in FIG. 1.

Solution to Problem

A fastening structure according to the present invention is a fastening structure for fastening a left-right screw intersection forming bolt of FIG. 1. In FIG. 1, a left-right screw intersection forming bolt (1) is passed through a fastening target 5, the fastening target is tightened with a right screw nut (2) having a recess (2a), then an elastic member (3) having a rotation-preventing protrusion (3a) and a tongue portion (3b) shown in FIG. 2 is mounted in such a manner that the recess (2a) of the right screw nut (2) and the rotation-preventing protrusion (3a) of the elastic member (3) are meshed with each other, and then the elastic member (3) is tightened with a left screw nut (4) having a tapered surface (4a) and a recess (4b) shown in FIG. 3.

At this time, the tapered surface (4a) of the left screw nut (4) is tightened in a counterclockwise direction while pressing the elastic member (3), and eventually, the fastening is completed as shown in FIG. 4. At this time point, the tongue portion (3b) of the elastic member (3) inhibits the clockwise rotation of the left screw nut (4). At the same time, for the right screw nut (2) as well, the rotation-preventing protrusion (3a) of the elastic member (3) inhibits the counterclockwise rotation of the right screw nut (2), whereby the right screw nut and the left screw nut are fastened, and this fastening body completely fastens the left-right screw intersection forming bolt.

As shown in line 3 to line 46, the present invention includes a right screw nut (2) having a recess (2a), an elastic member (3) having a rotation-preventing protrusion (3a) and a tongue portion (3b), and a left screw nut (4) having a surface (4a) in which a contact surface with the elastic member (3) is tapered and a recess (4b), but using the same principle as that of this coupling structure, a fastening structure including a left screw nut (2h) instead of the right screw nut (2), an elastic member (3h) instead of the elastic member (3), and a right screw nut (4h) instead of the left screw nut (4) as shown in FIG. 9 can be adopted.

Advantageous Effects of Invention

In the present invention, it is possible to provide a fastening structure in which the left-right screw intersection forming bolt (1) includes the right screw nut (2) having the recess (2a), the elastic member (3) having the rotation-preventing protrusion (3a) and the tongue portion (3b), and the left screw nut (4) having the tapered surface (4a) and the recess (4b), the structure not being too complicated and not loosening, can be reused, and can be easily unfastened.

DESCRIPTION OF EMBODIMENTS

Figure 1:
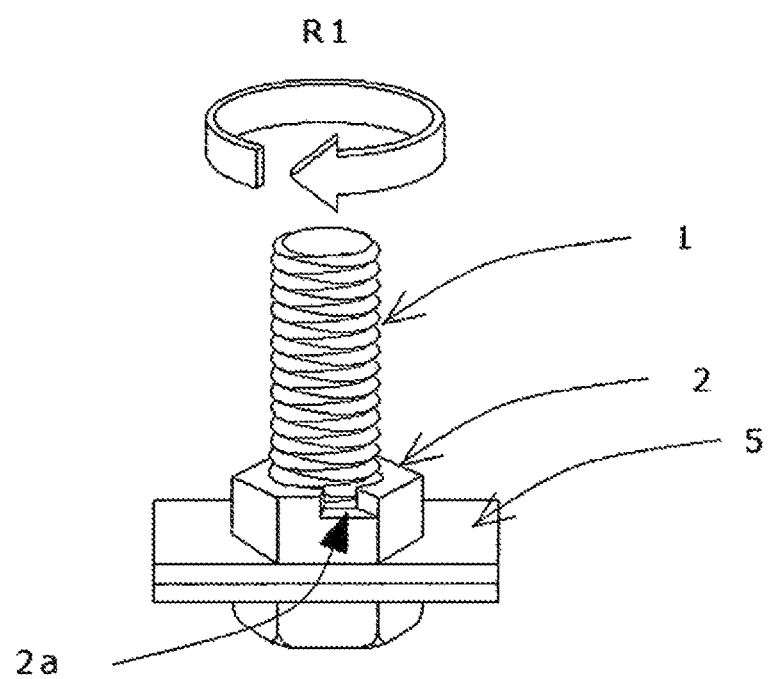
FIG. 1 is a perspective view for when fastened on a bolt according to the present invention with a right screw nut.

FIG. 1 is a view when a left-right screw intersection forming bolt (1) is passed through a fastening target (5) according to the present invention and fastened in a rotating direction of R1 by a right screw nut (2).

Figure 2:
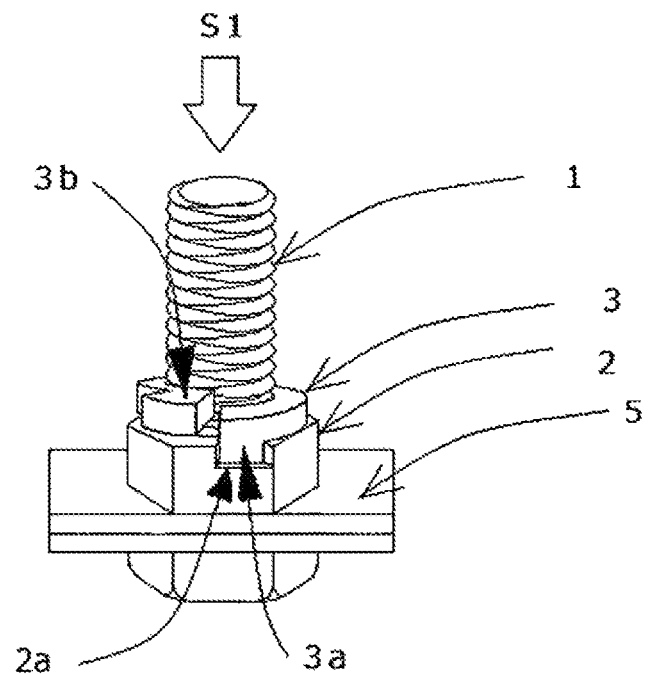
FIG. 2 is a perspective view for when an elastic member is mounted on the right screw nut.

FIG. 2 is a view in which the elastic member (3) is mounted in the direction of S1 such that a rotation-preventing protrusion (3a) of the elastic member (3) meshes with a recess (2a) on the right screw nut.

Figure 3:
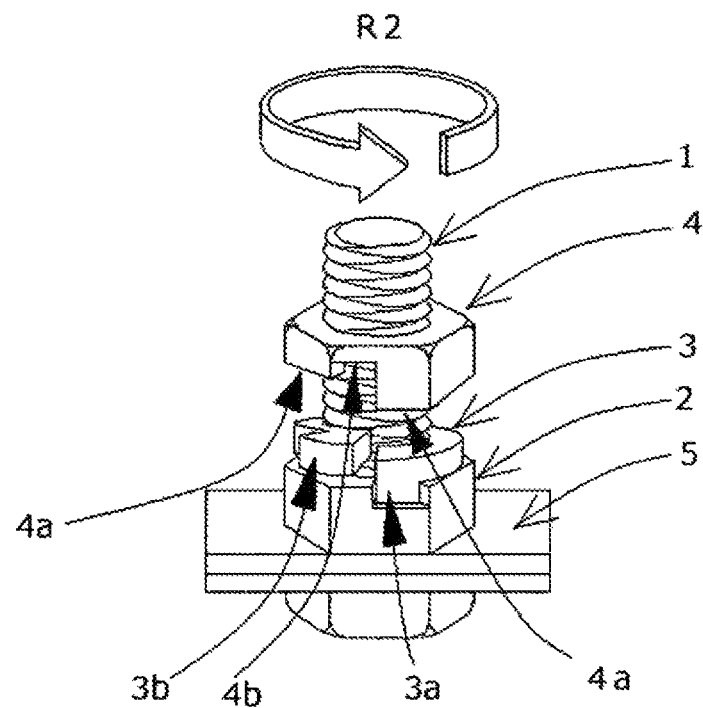
FIG. 3 is a perspective view for when fastened from above the elastic member with a left screw nut.

FIG. 3 is a view for when a left screw nut (4) is tightened on the elastic member (3) in a counterclockwise direction of R2, and the elastic member (3) is tightened by a tapered surface (4a) of the left screw nut (4).

Figure 4:
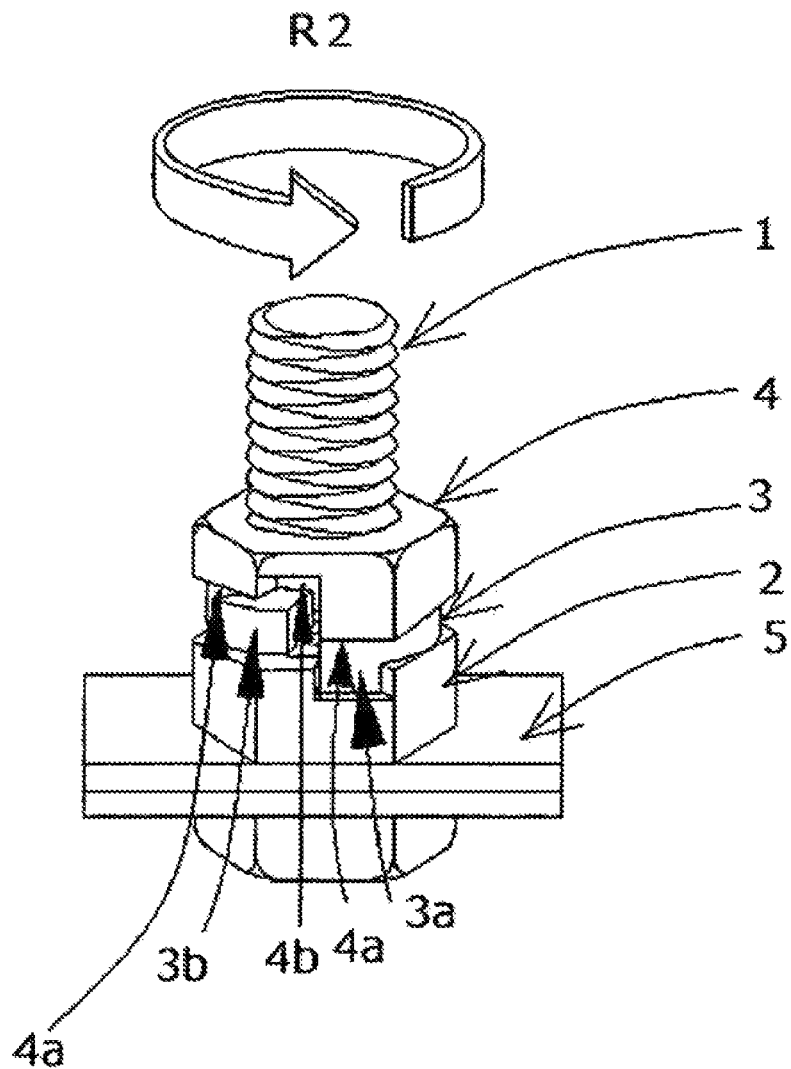
FIG. 4 is a perspective view for when the elastic member is further tightened with a left screw nut, and the nuts are locked to each other.
Figure 5:
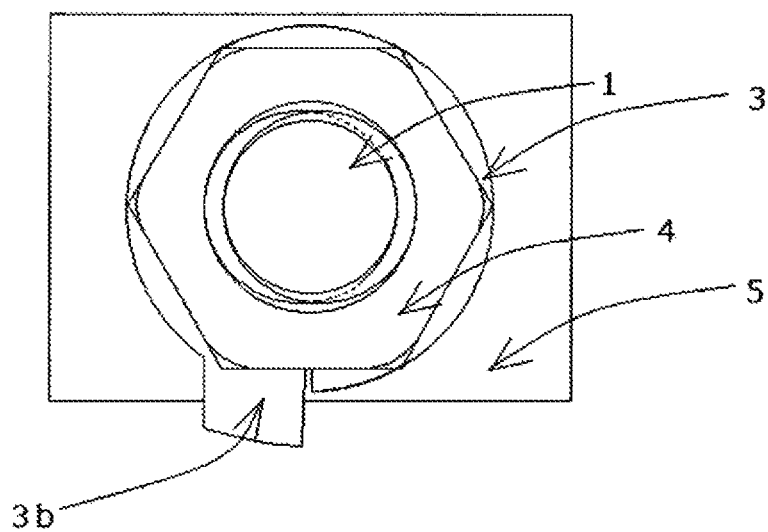
FIG. 5 is a top view of the fastening structure.
Figure 6:
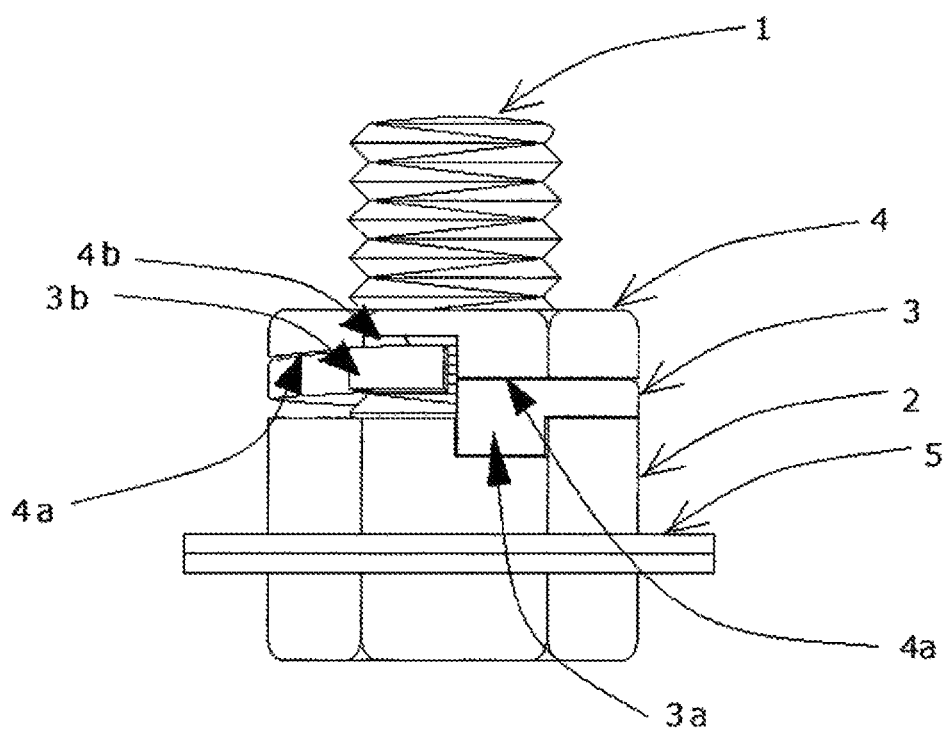
FIG. 6 is a side view of the fastening structure.

FIG. 4 is a view for when the left screw nut (4) is tightened by the rotation in the R2 direction, and eventually the tongue portion (3b) of the elastic member (3) jumps up to the portion of the left screw nut recess (4b), so that the fastening is in a locked state.

The fastening structure according to the present invention can be easily fastened or unfastened using a generally used wrench, a closed wrench, or a socket wrench.

Figure 8:
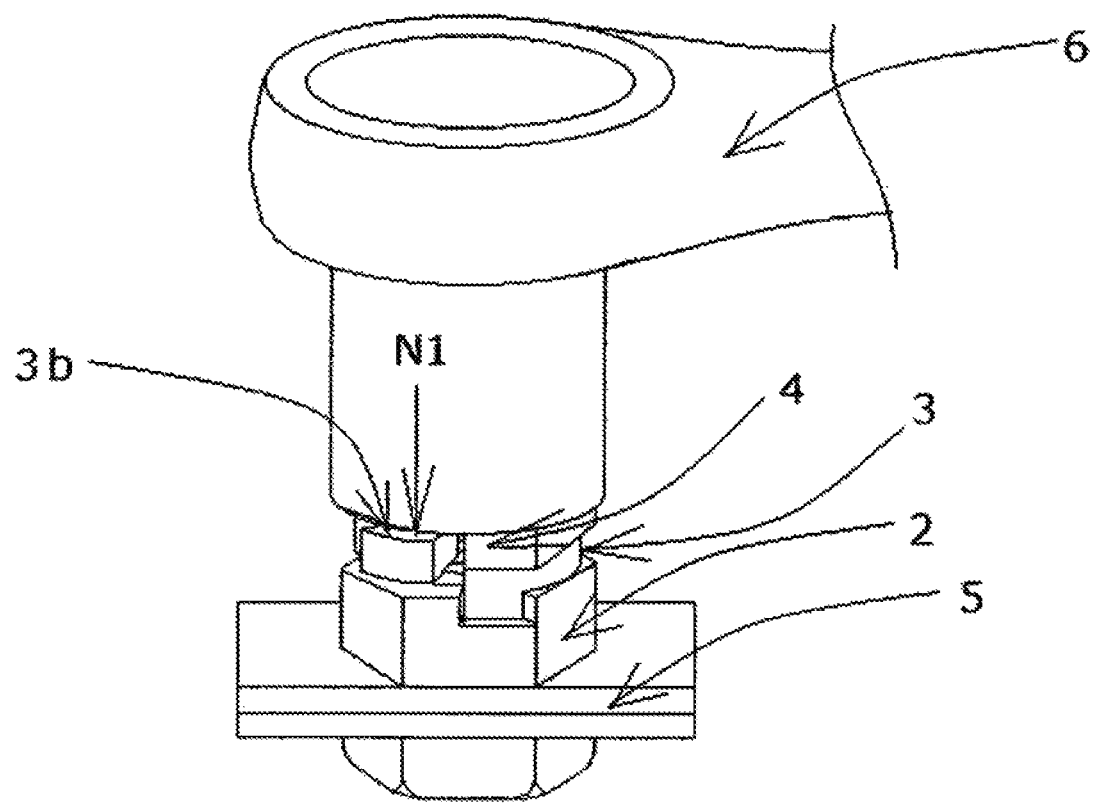
FIG. 8 is a perspective view for a case where the fastening structure is unfastened with a socket wrench.
Figure 9:
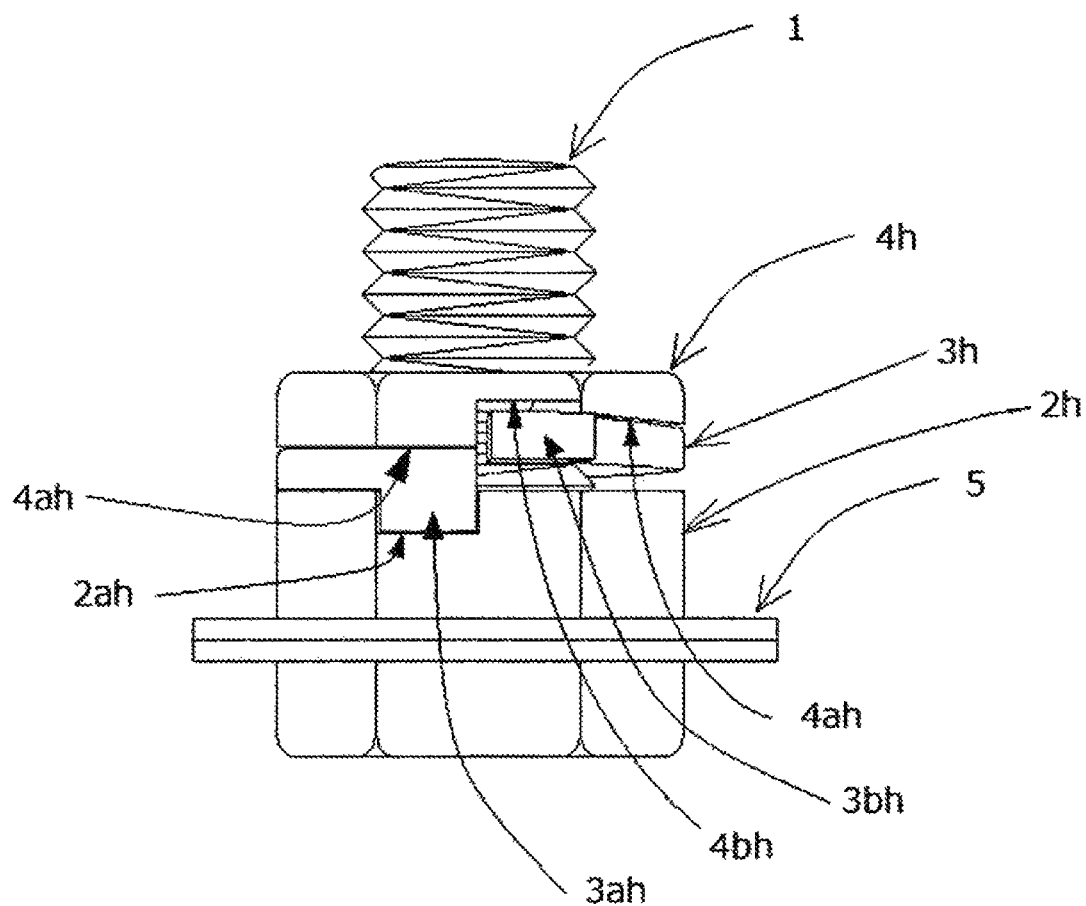
FIG. 9 is a side view for when the right screw nut (2) is a left screw nut (2h), the elastic member (3) is an elastic member (3h), and the left screw nut (4) is a right screw nut (4h).

FIG. 8 is a view for a case where unfastening is performed with a socket wrench. In this case, the edge portion of the distal end of the socket wrench pushes down the tongue portion (3b) of the elastic member (3) by merely pressing with the socket wrench in the N direction, and the locked state can be released merely by rotating the socket wrench in a clockwise direction while maintaining the state.

Figure 7:
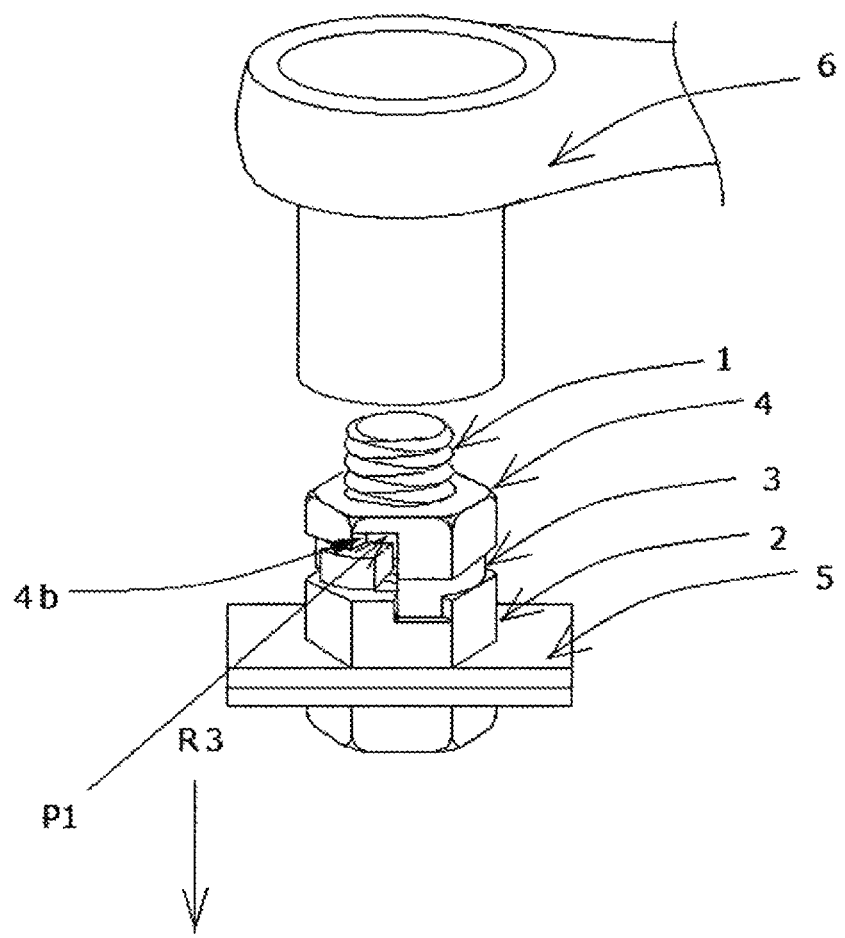
FIG. 7 is a perspective view for a case where the fastening structure is fastened or unfastened with a socket wrench.

When there is no socket wrench, a flat-blade screwdriver is inserted into the recess (4b) of the left screw nut (4) in FIG. 7 in the P1 direction, the handle of the screwdriver is pushed down in the R3 direction, and while this state is maintained, a normal wrench or a closed wrench is set and turned to the right, so that the fastening lock state can be easily released.

REFERENCE SIGNS LIST

1 left-right screw intersection forming bolt
2 right screw nut having recess (2a)
2h left screw nut having recess (2ah)
2a right screw nut recess
2ah left screw nut recess
3 elastic member having rotation-preventing protrusion (3a) and tongue portion (3b)
3h elastic member having rotation-preventing protrusion (3ah) and tongue portion (3bh)
3a elastic member rotation-preventing protrusion
3b elastic member tongue portion
3ah elastic member rotation-preventing protrusion
3bh elastic member tongue portion
4 left screw nut having tapered surface (4a) and recess (4b)
4h right screw nut having tapered surface (4ah) and recess (4bh)
4a left screw nut tapered surface
4b left screw nut recess
4ah right screw nut tapered surface
4bh right screw nut recess
5 fastening target
6 socket wrench
N1 elastic member tongue portion pressing direction
P1 flat-blade screwdriver inserting direction
R1 clockwise direction
R2 counterclockwise direction
R3 pushing direction of handle portion by turning of flat-blade screwdriver
S1 elastic member mounting direction

The invention claimed is:

1. A fastening structure used for fastening a bolt formed by coaxially intersecting a right screw and a left screw, and comprising a right screw nut (2) having a recess (2a), an elastic member (3) having a rotation-preventing protrusion (3a) and a tongue portion (3b), and a left screw nut (4) having a surface (4a) in which a contact surface with the elastic member (3) is subjected to tapering and a recess (4b), wherein the tongue portion (3b) protrudes radially outward with respect to the left screw nut (4).

2. A fastening structure used for fastening a bolt formed by coaxially intersecting a right screw and a left screw, and comprising a left screw nut (2h) having a recess (2ah), an elastic member (3h) having a rotation-preventing protrusion (3ah) and a tongue portion (3bh), and a right screw nut (4h) having a surface (4ah) in which a contact surface with the elastic member (3h) is subjected to tapering and a recess (4bh), wherein the tongue portion (3bh) protrudes radially outward with respect to the left screw nut (4h).

* * * * *